March 5, 1957 G. S. SAUNDERS 2,783,665
DOWELING JIGS

Filed Aug. 2, 1954 2 Sheets-Sheet 1

INVENTOR
Gordon S. Saunders

BY Arthur Middleton

ATTORNEY

March 5, 1957  G. S. SAUNDERS  2,783,665
DOWELING JIGS

Filed Aug. 2, 1954  2 Sheets-Sheet 2

INVENTOR
Gordon S. Saunders

BY  *Arthur Middleton*

ATTORNEY

United States Patent Office 2,783,665
Patented Mar. 5, 1957

2,783,665

DOWELING JIGS

Gordon S. Saunders, Neshanic Station, N. J.

Application August 2, 1954, Serial No. 447,088

7 Claims. (Cl. 77—62)

This invention relates generally to the class of tools and is directed particularly to improvements in doweling jigs and while the invention is particularly applicable to wood-working it may be employed also with equal efficiency in working with metals, plastics or other materials.

In the fabrication of various structures of wood, metal or other materials, particularly in wood-working, in the making of articles of furniture, where the invention may find its greatest use, frames of various kinds such as window screen frames, picture frames or any other units where two or more pieces of material are to be joined together with opposing or abutting faces, use is frequently made of dowels for securing the pieces of work together, not only for the purpose of obtaining a strong joint but also where it may be desired to avoid, especially in wood working, the use of nails, screws or other securing elements which would be exposed on a face of the work and which would have to be countersunk and covered if they are not to be seen.

Before the development of any type of jig for holding a drill bit in proper position for forming the dowel hole, it was necessary for the carpenter or cabinetmaker to very carefully lay off center lines and drill centers for forming the holes in which the dowels were to be fixed and extreme difficulty was encountered in getting the dowel holes in one piece of work exactly positioned to match the holes in the opposite piece of work so that when the dowels were inserted in one set of holes in one workpiece, they would enter accurately into the holes of the other piece. Not only was it difficult to get the dowel holes spaced exactly the same in the two adjoining pieces but it was also difficult to make the holes coincide so that the side faces of the pieces of work would match up or fall in the same plane.

The perfection of certain types of doweling jigs made possible the accurate centering of a drill bit with respect to the face of a piece of work and also made it possible to hold the drill bit exactly perpendicular or in any other desired relation to the face of the work in which the hole is to be made. However, while such doweling jigs made it easier to accurately position the holes, certain preliminary measurements still have to be made such as determining the width of the face in which the hole is to be drilled and then setting the doweling jigs in accordance with such measurements so that the drilled hole would be centrally located between opposite sides of such face. Furthermore, such jigs do not assist in locating the hole centers exactly the same distance apart in the two pieces of work but the pieces of work must be marked off to designate the positions of the hole centers and the jig is then set with an index mark coinciding with the markings on the work.

In the light of the foregoing, it is an object of the present invention to provide a new and novel doweling jig which substantially eliminates the necessity of making any preliminary measurements or calculations for locating a drill bit at a central position between two sides of the face of a work piece.

Another object of the invention is to provide a doweling jig which is constructed as a unitary tool, that is, it does not have a number of separable parts which must be assembled in at predetermined order to facilitate the use of the tool.

As stated, doweling jigs are known which clamp to the workpiece and have a guide for the drill bit. However, to use such jigs preliminary calculations must be made such as first determining the width of the face in which the dowel hole is to be made and then making certain settings of parts of the jig in accordance with the size of the drill bit selected so that the hole when drilled will be in the exact center of the work.

It is, accordingly, another object of the invention to provide a doweling jig which is so constructed and arranged that when it is clamped to the work by a clamping member or jaws forming a part of the jig structure, the drill bit guide means and bit engaged therein will be automatically centered between the sides of the work and held perpendicular to the face in which the hole is to be drilled.

As has also been previously set forth, doweling jigs of known construction require that the user make preliminary calculations and markings designating the centers between the dowel holes and the jig is then set on each piece of work with an index mark coinciding with the hole center marking made on the work.

It is accordingly another object of the present invention to provide a doweling jig wherein, after the formation of the first dowel hole, successive holes may be made in each of the work pieces at exactly the same center spacings without having to lay off the spacings on the work.

Still another object of the invention is to provide an improved doweling jig having coacting work-engaging jaws which are designed to cause a minimum of interference with the setting of the piece of work with the jig attached thereto into a bench clamp or vise.

The foregoing and possibly other objects are obtained through the provision of a body in the form of an elongate frame comprising a top plate and a bottom plate secured in vertically spaced parallel relation with the bottom plate extended a substantial distance beyond one end of the body forming a tail-piece which carries a position locator which is employed for reproducing a number of holes spaced exactly the same distance apart.

Extending transversely of the bottom plate are two bars in spaced parallel relation and each of which is pivotally attached midway between its ends to the bottom plate on the longitudinal center thereof for swinging movement in a common plane parallel with the bottom plate.

On opposite sides of the body are two straight edge members constituting jaws each of which extends across and beneath the ends of two bars to which it is pivotally attached so that, upon the simultaneous swinging of the bars, such straight edge members may be moved together or apart while maintaining a spaced parallel relation.

Upon the outer ends of two diagonally spaced bar ends are pivotally mounted screw blocks and connecting these screw blocks and extending across the upper side of the bottom plate of the body is a screw shaft having right-hand threads throughout a substantial portion of one end and left-hand threads throughout a substantial portion of the opposite end and said threaded end portions are threaded through said blocks, the screw shaft at one end carrying a suitable head to facilitate its rotation.

The top and bottom plates of the body are provided with vertically aligned drill bit apertures of different diameters designed to take different sizes of drill bits, the centers of such apertures being in a common vertical plane extending longitudinally of the body and said position locator means and the pivots for the straight edge members are also in such plane.

Upon the rotation of the screw shaft, the straight edge members constituting work clamping jaws will be caused to move together or apart while maintaining constant spaced parallel relation one with the other and with respect to the said vertical plane of the tool body upon opposite sides of which the jaws are positioned. Thus, when a piece of work is placed between the jaws and the jaws are driven together to grip the work from opposite sides, the drill bit guide means will be automatically located to position the center of rotation of a drill bit extended therethrough toward the underlying face of the work exactly midway between the opposite sides of the work.

The said position locator means constitutes a pin adapted to be set in a selected one of a number of different positions longitudinally of the tail piece forming the extending portion of the bottom plate of the body so that after the formation of the first dowel hole, such position locator pin can be engaged in the hole to facilitate the formation of a second, third or fourth hole as may be desired, and upon transferral of the jig to a second workpiece which is to be doweled to the first workpiece, a series of holes can be formed therein having exactly the same spacing as the holes formed in the first piece.

The invention will be best understood from a consideration of the following detailed description taken in connection with the accompanying drawings forming a part of the specification, with the understanding that the invention is not confined to a strict conformity with the showing of the drawings but may be changed or modified within the scope of the appended claims.

Figure 1:
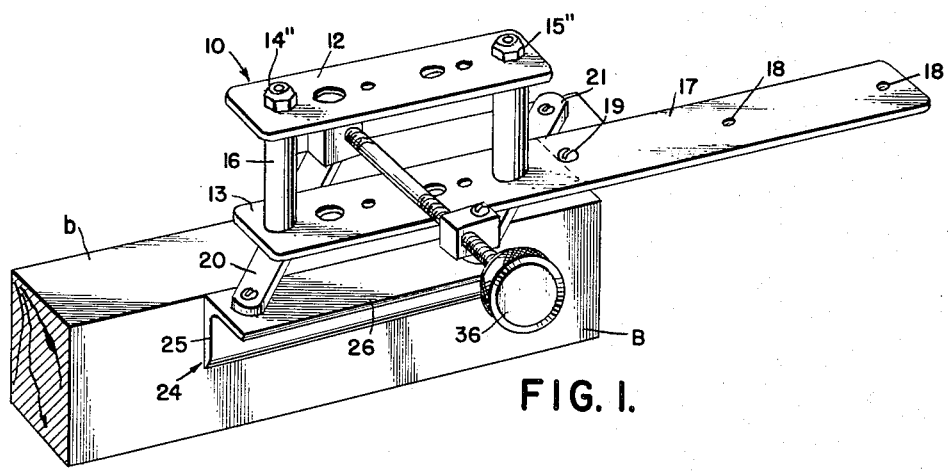
Fig. 1 is a view in perspective of a doweling jig constructed substantially in accordance with the present invention and showing the same applied to a piece of work.

Referring now more particularly to the drawings, the numeral 10 generally designates the body of the jig which is here illustrated as being in the form of an open frame. This body formed as a frame, as shown, comprises an elongate top plate 12 and a correspondingly formed bottom plate 13 which are disposed in spaced parallel relation and connected together by the tie bolts 14 and 15 which may be defined as being respectively at the forward or front end and at the rear or back end of the tool.

Interposed between the plates 12 and 13 are spacer sleeves 16 through which the tie bolts extend.

The bottom plate 13 of the body is extended rearwardly forming the elongate tongue or tail portion 17 forming a part of a position locating or spacer means for the tool. This extension 17 is provided with a plurality of threaded apertures 18 along its longitudinal center for selective reception of a positioning pin 19, the function of which will hereinafter be set forth.

Figure 5:
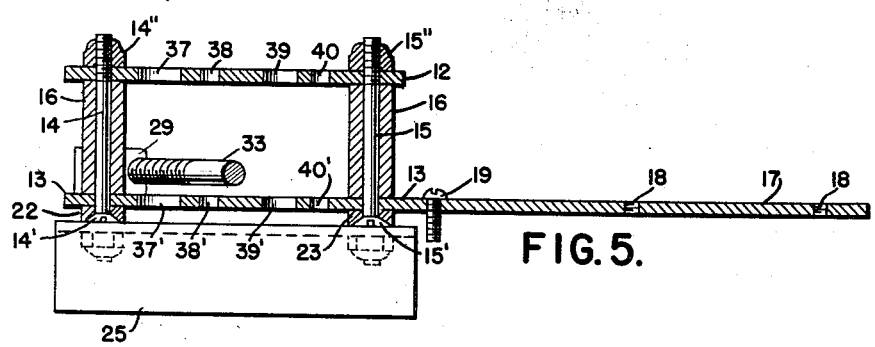
Fig. 5 is a sectional view taken in a vertical plane substantially on the line 5—5 of Fig. 4.

Disposed across the under side of the bottom plate 13 are forward and rear jaw bars 20 and 21. The forward bar 20 has an aperture 22 therethrough centrally between its two ends through which the lower end of the forward tie bolt 14 passes and this aperture is countersunk as shown in Fig. 5 to receive the flat head 14' of the bolt, the surface of which head comes flush with the under surface of the bar 20. The upper end of the bolt carries the securing nut 14" by which the parts are drawn and secured together.

The rear jaw bar 21 is likewise provided with an aperture 23 centrally between its ends, through which aperture the lower end or headed end of the tie bolt 15 extends and this aperture is also countersunk as shown to receive the flat head 15' of this tie bolt, the under face of the head being flush with the underside of the bar 21 while the upper end of the tie bolt receives the securing nut 15", the obvious function of which is to draw and secure together the parts between it and the head of the bolt.

While there have been illustrated and described tie bolts having flat heads which are countersunk in the jaw bars and which have nuts threaded upon their upper ends to connect the parts together, it is to be understood that other suitable coupling means may be employed it being required only that the transversely disposed jaw bars 20 and 21 be held with sufficient firmness against the under face of the bottom plate 13 to avoid wobbling but at the same time being freely rotatable or swingable in a common plane parallel with the under side of the bottom plate 13.

Disposed below and extending across the adjacent outer ends of the bars 20 and 21 are straight edge members 24 constituting work gripping jaws. Each of these members 24 is in the form of an angle bar having a vertical web 25 and the horizontal web 26 extending along the top edge of the web 25 and projecting outwardly away from the longitudinal center of the tool.

The work engaging inner faces of the webs 25 are in spaced parallel relation and are maintained in such relation at all times and in all positions of the jaws and such faces are equidistantly spaced from and at opposite sides of a vertical plane lying on the longitudinal center of the body plates 12 and 13.

As shown, the outer ends of the bars 20 and 21 are disposed against the top surfaces of the horizontal flanges 26 of the jaw members and two remote ends of the bars or two diagonally spaced ends thereof are pivotally joined to the underlying jaw flanges 26 by pivot pins or bolts 27 while the other two remotely related or diagonally located ends of the bars 20 and 21 are pivotally connected to the underlying ends of the jaw flanges 26 by the longer bolts 28, each of which pivotally maintains in position upon the top of the adjacent jaw bar a pivot block 29.

Figures 6, 7:
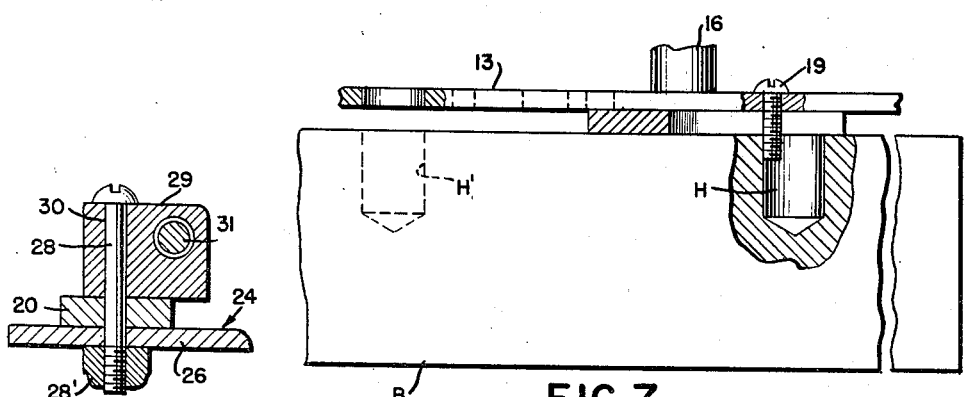
Fig. 6 is a detail section taken substantially on the line 6—6 of Fig. 4.
Fig. 7 is a detail view illustrating the use of the position locating means for locating the position of drilling for a second hole after the initial hole is formed.

The short pivotal connections 27 between the diagonally spaced ends of the jaw bars 20 and 21 are here shown as being in the forms of screws, each of which carries a nut 27' upon its lower end but, it is to be understood that other suitable pivotal connection may be used in place of the screw. Likewise, the longer pivots 28 are shown as screw members each of which carries a nut 28' upon its lower end as shown in Fig. 6 but in this case also another suitable pivot pin may be substituted if found desirable.

Each of the pivot blocks 29 has a vertical passage 30 therethrough through which the pivot member 28 passes and at one side of this passage there is formed the transversely extending threaded passage 31, the axis of which is at right angles to the axis of the passage 30.

Figure 4:
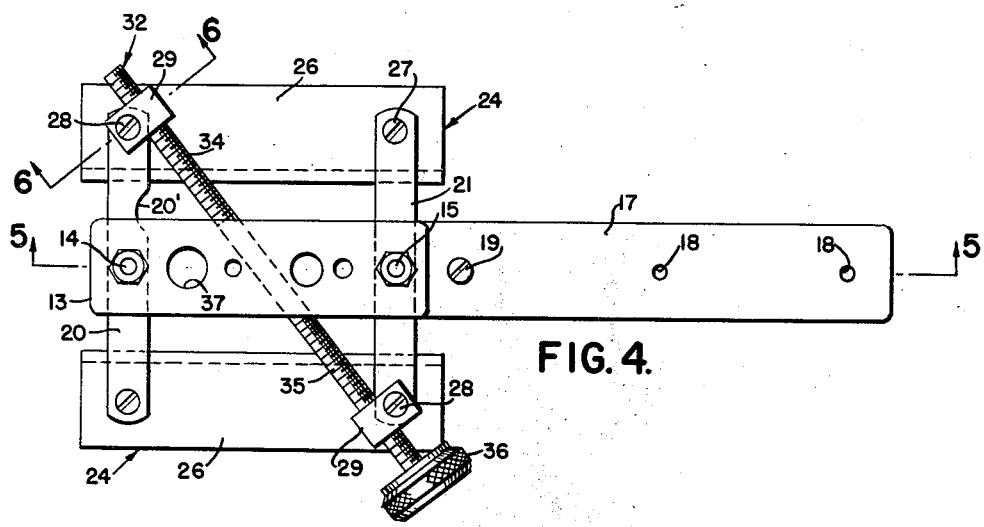
Fig. 4 is a view in top plan of the tool showing the jaws opened to the maximum degree.

Extending across the upper side of the bottom plate 13, is a jaw actuating screw which is generally designated 32. This screw comprises a long shaft 33 which is screw threaded from one end throughout a substantial extent of its length with right-hand screw threads as indicated at 34 while its opposite end is provided throughout a substantial extent of its length with left-hand screw threads 35. These threaded portions 34 and 35 extend through the threaded passages 31 of the pivot blocks 29 as illustrated in Figs. 2 and 4 so that the diagonally separated ends of the jaw bars 20 and 21 with which the pivot members 28 are connected, are coupled together by means of the operating screw through the medium of the pivot blocks 29.

To facilitate the rotation of the jaw actuating screw 32, one end of the screw has mounted thereon the knurled head 36.

For supporting a drill bit in working position for rotation and on an axis perpendicular to the face of the work in which the dowel hole is to be formed, the top and bottom plates 12 and 13 of the body are provided with a number of vertically aligned apertures of different diameters, the centers of which are in the vertical central longitudinal planes of the body plates. Obviously the body plates may be made of any desired length so that any number of drill bit receiving apertures may be provided. In the present illustration of the invention, four aligned pairs of apertures are shown, those apertures of each pair in the top plate being designated 37, 38, 39 and 40 and the corresponding apertures in the lower plate aligning with those in the upper plate being designated 37′, 38′, 39′ and 40′.

Figure 2:
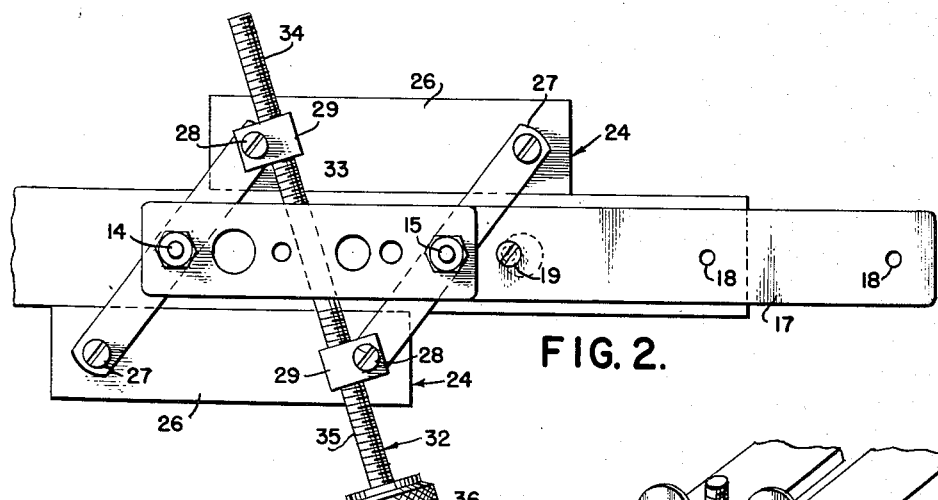
Fig. 2 is a view in top plan of the applied jig as illustrated in Fig. 1.

In the use of the tool for drilling a desired number of dowel holes in a piece of work such as the bar B illustrated in Figs. 1, 2 and 7, the position locator pin or screw 19 may be set in any desired one of the apertures 18 according to the distance the first hole is to be drilled from the end of the work and the spacing desired between two or more holes. The jaw operating screw 32 is then rotated in the proper direction to separate the jaws to a sufficient extent to receive the work body between them and the tool is placed upon the face of the work body in which the hole is to be drilled with the position locating pin 19 engaged against the end of the body as shown in Fig. 1 and with the bars 20 and 21 disposed across the work face and the jaws having the body located therebetween.

The jaw actuating screw is then rotated in the correct direction to move the jaw members together and it will be seen that due to the manner in which the jaw members are mounted and connected by the operating screw, the parallel relation of the work engaging faces or flanges 25 will be maintained at all times and they will be moved at the same rate toward the vertical central longitudinal plane of the body from which they are equidistantly spaced. Thus, when the jaw flanges have both engaged the work upon opposite sides thereof as shown in Fig. 1, the aligned centers of the drill bit guide apertures will be aligned with the longitudinal center of the face b of the body B in which the dowel hole is to be drilled.

After drilling the first dowel hole in the work by a drill bit maintained in one of the pair of aligned guide holes, the position locating pin 19 is shifted by lifting the tool from the work and replacing it so that the pin 19 will engage in the formed hole. In Fig. 7 the first hole is designated H and, as shown, when the tool is replaced on the work, the position locating pin 19 will be engaged against one side of the hole, preferably the side remote from the end of the work against which the pin 19 first engaged, the clamps are then reset and the second hole may be drilled as indicated at H′. Any number of holes may thus be formed in this manner and it will be seen that when these steps are repeated upon a second piece of work, the spacing of the first hole from the end of the work will be the same as that on the first work piece and the spacing of the subsequent holes will be exactly repeated. Accordingly when the dowel pins are set in one set of holes, they will accurately match the second set as to spacing longitudinally of the work and as to the position between the sides of the work so that when the work pieces are joined by the dowels the side faces will be flush with one another. Due to the form of the straight edge members constituting the engaging jaws, it will be seen that when the tool is applied to the work body, the latter can be easily set in a vise or bench clamp and if the height of the work piece does not provide very much surface to be gripped between the clamp jaws, the jaws can be engaged against the outer or back surfaces of the webs 25 of the tool jaws.

The jig of the present invention may, of course, be made any desired size or any desired length. Where it may be desirable to keep the length of the jig short and at the same time provide a number of drill bit guide apertures, when the tool is applied to a relatively thin or narrow piece of wood where the jaw bars must be swung to an acute angle with respect to the longitudinal central plane of the tool, in order to prevent the bars from interfering with the placement of the drill bit in the guide openings suitable recesses may be made in the inner edges of the bars such as that indicated at 25 in bar 20, which, when the latter bar is swung around to a sufficient extent comes into matching relation with the curvature of the adjacent opening 37′ as will be readily apparent thereby allowing for the extension of a drill bit through the opening without interference.

In the invention as thus far described, the position locating means has been set forth as comprising a screw or pin selectively positionable in any one of a number of apertures 18 spaced longitudinally of the extension 17.

Figure 8:
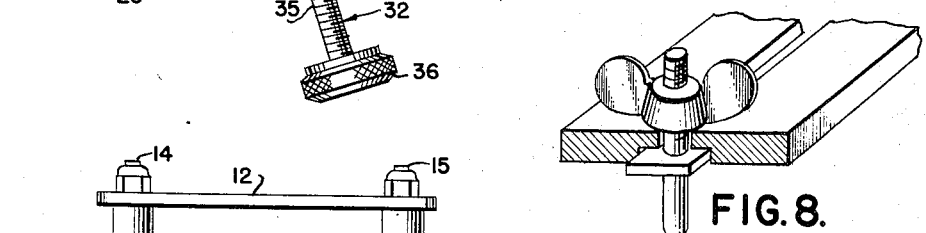
Fig. 8 is a detail perspective view showing another means of adjusting the position locating pin longitudinally of the instrument.
Figure 3:
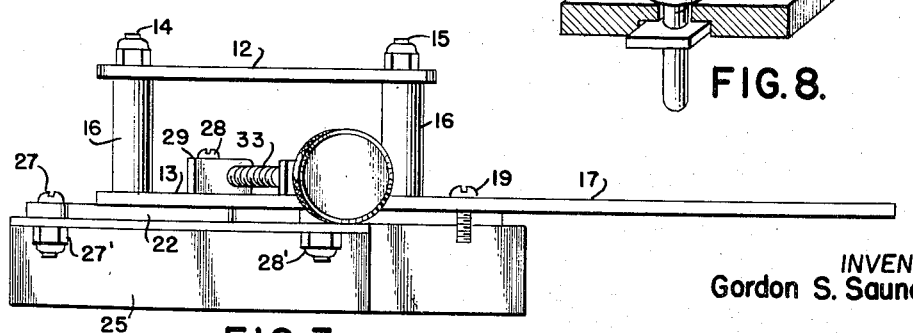
Fig. 3 is a view in side elevation of the applied tool.

In Fig. 8, another means is illustrated for adjusting the position of the pin whereby a more extensive number of positions of the pin can be obtained. In this figure, the extension of the bottom plate is designated 17a and this is provided with a longitudinally extending slot 50. The undersurface of the extension 17a is provided along each side of the slot 50 with a recess 51.

The position locating pin is generally designated 52 and comprises a screw threaded upper end portion 53 and a smooth lower end portion 54 and between these portions is a collar or plate 55 which encircles the pin and may be either circular or rectangular. It is preferable that the collar be rectangular so that the pin will be held against rotation when the collar is positioned in the recesses 51 in the manner shown.

As illustrated, the threaded portion 53 extends upwardly through the slot 50 and projects a substantial distance above the top of the extension 17a and the collar or plate 55 positions in the recesses as previously stated.

Adapted to be threaded on the upper end of the pin is a wing nut 56, the body portion of which is of a width materially greater than the width of the slot 50 so that when the nut is threaded upon the threaded end of the pin, the body will frictionally engage the top of the extension 17a and pull the collar or plate 55 up into the recess.

The depth of the recesses 51 is equal to or slightly greater than the thickness of the collar or plate 55 so that when the latter is drawn to position after adjusting the pin to the desired position longitudinally in the slot, no portion of the collar will project beyond the underface of the extension 17a and thus, when the lower end 54 of the pin is located either against an end of a piece of work or in a previously formed aperture, in the manner of the pin 19 shown in Fig. 7, the undersurface of the extension will lie flat on the top surface of the work piece.

From the foregoing, it will be readily apparent that there is provided by the present invention a relatively simple unitary tool which, when applied to a piece of wood, will automatically center itself on the work so as to locate the drill bit guide openings centrally between the side edges of the face in which the dowel hole is to be formed. Also, as previously pointed out, the tool provides not only for automatically centering the drill bit guide means on the work but also provides means whereby the dowel holes can be accurately matched as to spacing in both pieces of work which are to be joined together by the dowels without requiring any preliminary figuring or laying off of centers on the work pieces.

The present tool also provides the foregoing advantages without requiring the assembling of removable parts such as is required in connection with the use of other known types of doweling jigs. The only adjustment required to be made in the position of a removable element is the shifting of the position locating pin or screw 19 to provide for a different spacing between the centers of the dowel holes.

I claim:

1. A doweling jig comprising a body carrying means for supporting a drill bit for rotation on an axis perpendicular to a surface in which a dowel hole is to be drilled, work gripping jaws having opposing parallel gripping faces located relative to the body with said axis passing centrally therebetween and parallel with the faces, a pair of parallel bars disposed transversely of the body and of said jaw faces, pivot means coupling the bars to the body to swing on axes parallel with the first axis, pivot couplings between each jaw and two adjacent ends of said bars, said last pivot couplings being parallel with the first axis, and means operatively coupling said bars for swinging the same in parallel relation on the first named pivot means to effect movement of the jaws in parallel relation and at the same rate relative to the first axis.

2. The invention according to claim 1, wherein the last named means comprises an actuating screw disposed across remotely related end portions of said bars and having right and left hand threads and a body pivotally connected to each of said bar end portions and one bar carried body having a right hand threaded bore receiving corresponding threads of said screw and the other bar carried body having a left hand threaded bore receiving the corresponding threads of said screw.

3. A doweling jig according to claim 1, with means carried by the body for positioning the drill bit supporting means at a predetermined spaced relation to an end of the work or a previously formed dowel hole in the work, said positioning means comprising an elongate element carried by the body and extending therefrom longitudinally in a direction to parallel and extend over the surface of the work in which a dowel hole is formed, a pin carried by said elongate element depending downwardly therefrom parallel with and in longitudinal alignment with the axial center of the drill bit supporting means in position to engage an end of the work or in a previously formed dowel hole therein, and means providing for adjusting the position of the pin lengthwise of said elongate element.

4. A doweling jig according to claim 1, with means carried by the body for positioning the drill bit supporting means at a predetermined spaced relation to an end of the work or to a previously formed dowel hole in the work, said positioning means comprising an elongate element carried by the body and extending therefrom longitudinally in a direction to parallel and extend over the surface of the work in which a dowel hole is formed, and a pin carried by said elongate element depending downwardly therefrom parallel with and in longitudinal alignment with the axial center of the drill bit supporting means in position to engage an end of the work or in a previously formed dowel hole therein, said elongate element having a series of spaced vertical threaded apertures therethrough, the series of apertures extending longitudinally in alignment with the axial center of the drill bit supporting means, and said pin having a threaded upper part to selectively engage said apertures.

5. A doweling jig comprising a frame body having an elongate top plate, an elongate bottom plate paralleling and in the vertical plane of the top plate and spaced therefrom and front and rear tie members between the plates, a pair of spaced parallel bars disposed across the underside of the bottom plate, pivot means coupling the bars intermediate their ends with the bottom plate to swing on parallel axes, a pair of elongate jaw members in spaced parallel relation and each disposed across two adjacent ends of said bars, pivot means connecting each jaw member with the bar end thereacross, the turning axis of the last pivot means paralleling the first pivot means, means carried by said body plates for rotatably supporting a drill bit for turning on an axis lying on the longitudinal centers of the bars and passing midway between the jaw members, and means operatively coupling remote end portions of said bars for simultaneously swinging the bars to effect parallel movement of the jaw members.

6. The invention according to claim 5, wherein the last means comprises pivot blocks each pivotally mounted on one of the said remote end portions of the bars and one having a right hand threaded bore therethrough and the other having a left hand threaded bore therethrough and a screw having right and left hand threaded ends threaded through said bores.

7. The invention according to claim 5, wherein said jaw members each comprises an angle bar with one web having its outer face in a vertical plane and forming a jaw face and having its other web projecting from the top edge of said one web and outwardly with respect to the drill bit axis and having the adjacent end of the bars lying thereacross.

References Cited in the file of this patent
UNITED STATES PATENTS

| 419,788 | Minnich | Jan. 21, 1890 |
| 1,166,968 | Carter | Jan. 4, 1916 |
| 2,602,238 | Wellman | July 8, 1952 |
| 2,612,793 | Timpner | Oct. 7, 1952 |